No. 646,287. Patented Mar. 27, 1900.
R. HUNDHAUSEN.
STEP-BY-STEP MOTION MECHANISM.
(Application filed July 31, 1899.)

(No Model.) 10 Sheets—Sheet 1.

Witnesses:
Anton A Glaetzner
M. C. Massie

Inventor:
Rudolf Hundhausen
by Max Ringü
Attorney.

THE NORRIS PETERS CO., PHOTO-LITHO., WASHINGTON, D. C.

No. 646,287. Patented Mar. 27, 1900.
R. HUNDHAUSEN.
STEP-BY-STEP MOTION MECHANISM.
(Application filed July 31, 1899.)
(No Model.) 10 Sheets—Sheet 2.

Witnesses:
Anton Alloetzner
M. C. Massie

Inventor:
Rudolf Hundhausen
by Max Ingü
Attorney.

THE NORRIS PETERS CO., PHOTO-LITHO., WASHINGTON, D. C.

No. 646,287. Patented Mar. 27, 1900.
R. HUNDHAUSEN.
STEP-BY-STEP MOTION MECHANISM.
(Application filed July 31, 1899.)

(No Model.) 10 Sheets—Sheet 4.

Witnesses:
Anton Gloetzner
M. C. Massie

Inventor:
Rudolf Hundhausen,
by Max Hargu
attorney.

No. 646,287. Patented Mar. 27, 1900.
R. HUNDHAUSEN.
STEP-BY-STEP MOTION MECHANISM.
(Application filed July 31, 1899.)
(No Model.) 10 Sheets—Sheet 5.

Fig. 10

No. 646,287. Patented Mar. 27, 1900.
R. HUNDHAUSEN.
STEP-BY-STEP MOTION MECHANISM.
(Application filed July 31, 1899.)
(No Model.) 10 Sheets—Sheet 6.

No. 646,287. Patented Mar. 27, 1900.
R. HUNDHAUSEN.
STEP-BY-STEP MOTION MECHANISM.
(Application filed July 31, 1899.)
(No Model.) 10 Sheets—Sheet 7.

Fig. 12

Witnesses
Anton A Gloetzner
M. C. Massie

Inventor:
Rudolf Hundhausen,
by Max J. Pugii
Attorney.

No. 646,287. Patented Mar. 27, 1900.
R. HUNDHAUSEN.
STEP-BY-STEP MOTION MECHANISM.
(Application filed July 31, 1899.)
(No Model.) 10 Sheets—Sheet 8.

Witnesses:
Anton Gloetzner
M. C. Massie

Inventor:
Rudolf Hundhausen,
by Max Thigii
Attorney.

UNITED STATES PATENT OFFICE.

RUDOLF HUNDHAUSEN, OF WILMERSDORF, GERMANY.

STEP-BY-STEP-MOTION MECHANISM.

SPECIFICATION forming part of Letters Patent No. 646,287, dated March 27, 1900.

Application filed July 31, 1899. Serial No. 725,711. (No model.)

*To all whom it may concern:*

Be it known that I, RUDOLF HUNDHAUSEN, a subject of the German Emperor, residing at Wilmersdorf, near Berlin, Germany, have invented an Improved Mechanism for Effecting Controlled or Positive Step-by-Step Motion; and I do hereby declare the following to be a full, clear, and exact description of the invention, such as will enable others skilled in the art to which it appertains to make and use the same.

This invention relates to arrangements of ratchet mechanism whereby the actuated device is forced to follow accurately the movements of the driving mechanism or is held stationary on its support.

Of the accompanying drawings, Figures 1 and 2 are diagrams. Figs. $1^a$ to $1^f$ and $2^f$ are diagrammatical representations of the herein-described mechanism.

Figure 1:
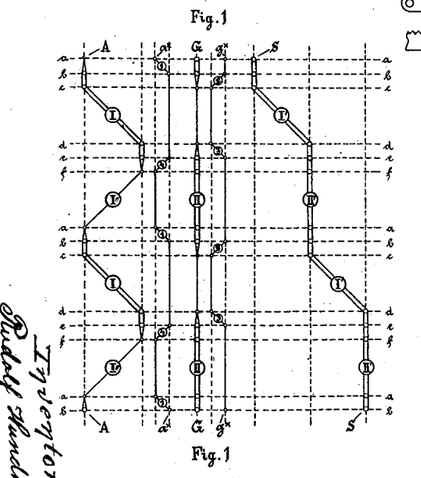
Figure 1A:
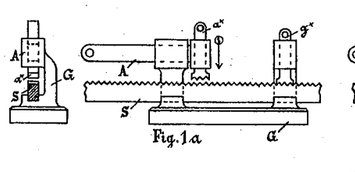
Figures 1B, 1C, 1D, 1E, 1F, 2, 2F:
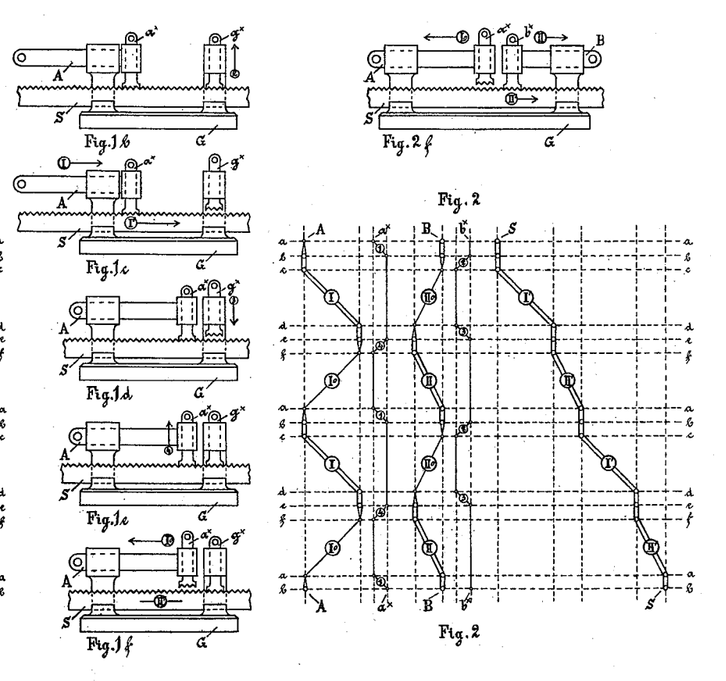

Referring to Figs. 1 to $1^f$, A represents the driving mechanism, S the actuated device, and G the framing. A and S are parallel prismatic bars guided in G, the part A carrying a pawl $a^\times$, sliding at right angles thereto and adapted to engage with S, while the framing G carries a sliding pawl $g^\times$, also adapted to engage with S. Thus by the engagement of the one or other pawl the bar S is locked either to A or to G. The engagement of the pawls with the bar S can be effected in various ways—such as by teeth or serrations or by frictional contact. This is indicated in a general manner in Figs. $1^a$ to $1^f$ and $2^f$ by forming fine serrations on the upper surface of the bar S and on the under surfaces of the pawls $a^\times$ and $g^\times$.

The intended step-by-step motion of the bar S is effected by causing the movements of the parts A $g^\times$ $a^\times$ to take place consecutively, in the manner indicated in Figs. $1^a$ to $1^f$ by means of arrows, and, as hereinafter described with reference to the Roman and Arabic numerals, for indicating the movements of the parts $a^\times$ $g^\times$ and A G S. Fig. $1^a$: While the locking-pawl $g^\times$ is engaged with the bar S, so that this is held stationary in the frame G, the actuating-pawl $a^\times$ is moved downward in engagement with S, (position 1.) Fig. $1^b$: After the pawl $a^\times$ is engaged with S, so as to connect this to A, the locking-pawl $g^\times$ is raised out of engagement, (position 2.) Fig. $1^c$: In consequence hereof the connection between the bar S and the frame G ceases, and S is consequently only held by the actuating-bar A so as to move therewith, so that if A is moved to the right (I) the bar S is carried along thereby—*i. e.*, shifted forward, (I'.) Fig. $1^d$: After this motion has been effected the locking-pawl $g^\times$ is again lowered into engagement, (3,) so that the bar S is now again held in the frame in its new position. Fig. $1^e$: In order that the actuating-bar A may move back again, the actuating-pawl $a^\times$ is now raised again, (4.) Fig. $1^f$: The bar A can then perform its idle return motion, (1°,) while the bar S remains stationary—*i. e.*, is locked to the framing G, (II'.)

In the above-described manner the six consecutive phases are repeated, these being indicated in the diagram Fig. 1, as follows: The several positions indicated at Figs. $1^a$ to $1^f$ are represented by horizontal lines marked at each end with the letters $a\, a$ to $f\, f$. The movements of the several parts are indicated by downward-extending lines, which are marked at each end, respectively, with A A, $a^\times\, a^\times$, $g^\times\, g^\times$, and S S. The main phases of motion of the parts marked A, S, and G are indicated by Roman numerals and those of the parts $a^\times$ and $g^\times$ are indicated by Arabic numerals. The movements of the actuating parts A, as also those of the actuating-pawls $a^\times$ and those of the locking-pawl $g^\times$, are reciprocating movements, with intervals of rest, the several phases being always shifted relatively to each other. The movements of the bar S are step-by-step-advancing ones, as shown in Fig. 1. Between $a$ and $b$ is effected the engagement of the actuating-pawl $a^\times$, (1;) between $b$ and $c$ the disengagement of the locking-pawl $g^\times$, (2;) between $c$ and $d$ the working forward motion of the actuating device A, (I,) and consequently the forward motion of bar S, (I';) between $d$ and $e$ the engagement of the locking-pawl $g^\times$, (3;) between $e$ and $f$ the disengagement of the actuating-pawl $a^\times$, (4;) between $f$ and $a$, finally, the idle return motion of the actuating device A, (I°,) while the part S is obliged to remain stationary with the frame G, (II,) thus producing the locking phase, (II'.)

During the intervals of time for the several parts periods of rest occur as follows: From $a$ to $c$ and from $d$ to $f$ the actuating device A is stationary. From $b$ to $e$ and from $f$ to $a$ the actuating-pawl $a^\times$ is stationary. From $c$ to $d$ and from $e$ to $b$ the locking-pawl $g^\times$ is stationary. From $a$ to $c$ the connection of the bar S with the actuating device A and the disengagement thereof from the framing G takes place by means of corresponding consecutive movements of the actuating-pawl $a^\times$ and locking-pawl $g^\times$—namely, from $a$ to $b$ the engagement of $a^\times$ (1) and from $b$ to $c$ the disengagement of $g^\times$, (2.) From $d$ to F the connection of the bar S with the framing G and its disengagement from the actuating device A is effected by the consecutive motions of the pawls $a^\times$ and $g^\times$—namely, from $d$ to $e$ the engagement of $g^\times$ (3) and from $e$ to $f$ the disengagement of $a^\times$, (4.)

The movements of the actuating-pawl $a^\times$ (1 and 3) and the locking-pawl $g^\times$ (2 and 4) are effected consecutively in such manner that either the one or the other or both pawls are simultaneously engaged with the bar S; but they are never both disengaged therefrom at the same time. Consequently the engagement of the one always takes place before the disengagement of the other. In the positions $b$ and $e$ both pawls are in gear, in consequence of which not only the bar S, but also the actuating device A is prevented by their agency from moving relatively to the framing G. This condition also occurs for the continuous periods from $a$ to $c$ and from $d$ to $f$, in the first of which the translation from locking to actuating and in the last the reverse transition from actuation to locking is effected. Within these periods, therefore, the actuating device A must remain stationary—that is, the line A A describing its motion must run parallel with the vertical straight line G G, Fig. 1, indicating the stationary position of the framing G. In the position $b$ the influence of the actuating device A upon the bar S commences, while that of the framing G ceases. In the position $e$ the reverse takes place. In the entire interval of time (made up of three parts) from $b$ to $e$, therefore, the bar S is forced to partake of the motion of the actuating device A, which is stationary from $b$ to $c$ and from $d$ to $e$. In the other interval of time (also made up of three parts) from $e$ to $b$ the bar S must remain stationary with the frame, so that strictly speaking the locking takes place not only in the interval from $f$ to $a$, but also in the entire interval from $e$ to $b$. On the other hand, the stationary phase of the bar S occurring during the still greater interval from $d$ to $c$ must be considered, as regards its first part from $d$ to $e$ and in its last part $b$ to $c$, not as a locking phase, but as an actuation phase, because the bar S is not connected during these two intervals with the framing G, but with the actuating device, which is at those times only stationary.

Figure 3:
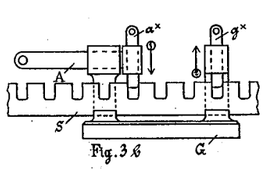
Figs. 3 and 4 are diagrams showing modifications, and Figs. $3^a$ to $3^f$ and $4^i$ are diagrammatical representations of modifications of the herein-described mechanism.

As indicated in Fig. 1 by means of pairs of parallel lines I I' and II II', the motion of the bar S may be considered as a copy, pieced together, of the motion and stationary phases, respectively, of the actuating device A and the framing G. It will be seen from Fig. 2 and the corresponding Fig. 2$^f$ that such motion and stationary phase may be regarded as of equal value. In this case the locking-pawl $g^\times$ is replaced by a second actuating-pawl $b^\times$, which is carried by a second actuating device B, this being arranged to slide in the framing G in the same way as A. If in this arrangement the two actuating devices A and B have alternately a to-and-fro motion imparted to them, the pawls $a^\times$ and $b^\times$ being moved in a manner corresponding to that described with reference to $a^\times$ and $g^\times$, the bar S will be made to participate alternately in the motion of the one or other actuating device. Also in this case the separate movements of the two actuating devices A and B and the corresponding pawls $a^\times$ and $b^\times$ will take place exactly in the same way and sequence as before, in six consecutive phases, only in this case there occurs in the place of the stationary period (II) of the framing G a reciprocating motion with periods of motion (II° II) of the device B, and in place of the stationary period (II') of the pawl $g^\times$ a second motion, (II'.) A somewhat-different action takes place with the locking mechanism shown at Figs. 3 to 4'. In this case it is possible that the two up and down motions, taking place consecutively in pairs, of the actuating and locking pawls $a^\times$ and $g^\times$ may take place simultaneously, so that the four intervals of time $a$ to $b$ and $b$ to $e$, as also $d$ to $e$ and $e$ to $f$, are drawn together into two intervals, from $a$ to $c$ and from $d$ to $f$, as shown at Fig. 3. In this case it is assumed that with such a change of motion, the end positions of which are, for example, shown in Figs. 3$^a$ and 3$^c$, the pawls $a^\times$ and $g^\times$ are never simultaneously entirely out of gear with the bar S, so that during the transition from the one movement to the other the medium position indicated at Fig. 3$^b$ will occur. Otherwise the movements take place exactly in the same way as in Figs. 1 to 2$^f$; but in this case they occur in only four consecutive movement phases instead of in six, the transition-points of which are indicated at Figs. 3$^a$, 3$^c$, 3$^d$, and 3$^f$.

Figure 4:
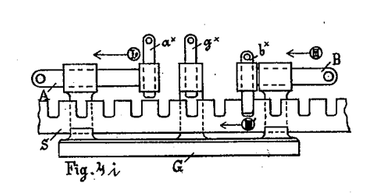

Figs. 4 and 4$^1$ show a compound arrangement, in which two actuating devices A and B, with two actuating-pawls $a^\times$ and $b^\times$, are provided, and in addition a locking-pawl $g^\times$, carried by the framing G, which act upon the bar S. It is assumed in this case that the bar S is moved step by step from $c$ to $d$ through two teeth-divisions forward, (I',) that it is stationary from $f$ to $g$, (II',) that it is moved backward through a distance of one tooth-division from $i$ to $k$, (III',) and then remains stationary from $m$ to $a$ again, (II'.) In the intermediate intervals of time from $d$ to $f$, from $g$ to $i$, from $k$ to $m$, and from $a$ to $c$, during which also the bar S is stationary, the reversal of the positions of the actuating and locking pawls $a^\times$ and $b^\times$ and $g^\times$ takes place in the manner indicated on the drawings and in the sequence 1 2 3 4 5 6 7 8. The idle return motion of the actuating device A (I°) must take place during the interval of time from $f$ to $a$, and the idle return motion of the actuating device B (III') during the interval from $m$ to $g$.

It will be seen from the above that variously otherwise combined movements can be carried out according to this invention. It should be specially mentioned that these motions can take place not only in rectilinear direction or in a circular direction backward and forward, but also either in a plane or in space at right angles to each other or in any other relative direction.

Of considerable importance is the prescribed positive motion of the locking and actuating pawls, above described with reference to Figs. 1 to $4^i$, as also the relation as to the time intervals between these motions and those of the actuating or driving device, by means of which the bar S or part actuated is uninterruptedly moved or is held stationary on the framing. The said motion is, however, subject to the condition that in different intervals of time alternately-consecutive to-and-fro motions and stationary phases of the several devices must take place, as is clearly shown from the above description and drawings.

The special case should be mentioned that in the direct transition of the bar S from the moving influence of an actuating device A into that of another actuating device B it is not necessary that all three should remain stationary together, but that they may also all three move together. It is only a necessary condition that at the time of transition they should not have any motion relative to each other.

I will now describe the manner in which the above laws of motion can be practically applied to various mechanisms, referring for this purpose to Figs. 5 to 15 of the drawings.

Figures 5, 6, 7, 8:
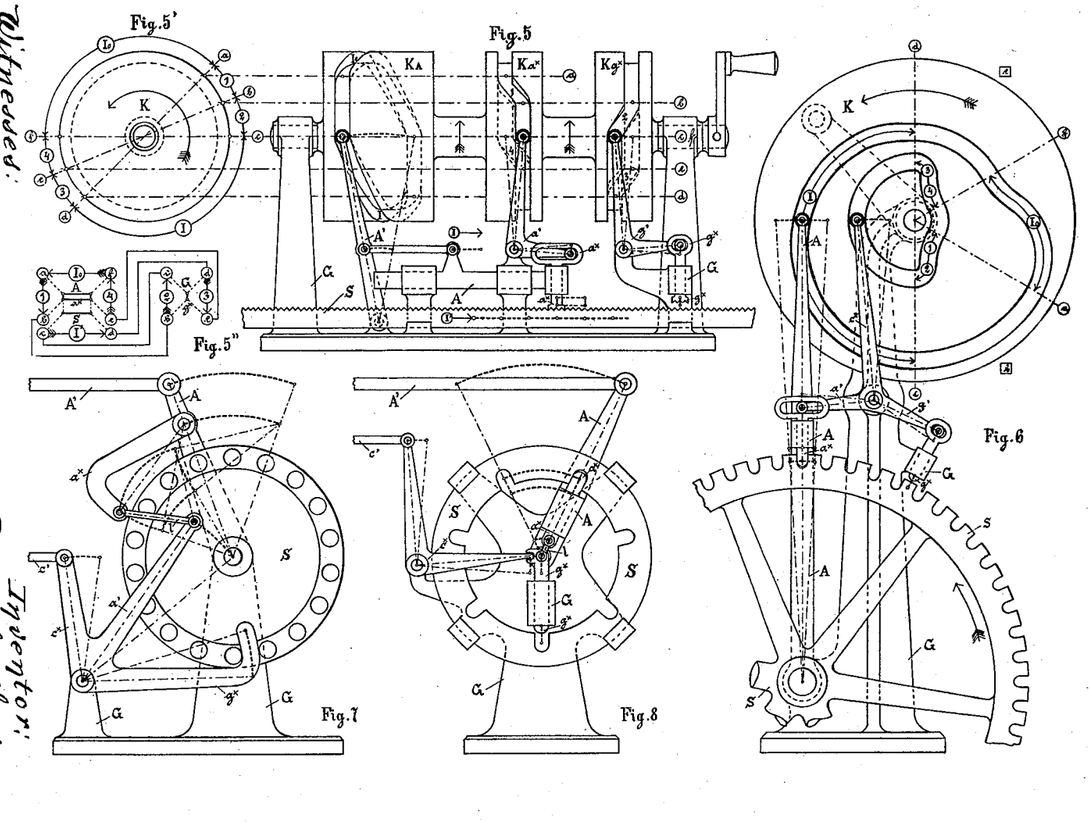
Fig. 5 shows a simple form of the herein-described mechanism, and Figs. $5^a$ and $5^b$ are diagrams explaining the action of the mechanism shown in Fig. 5.
Figs. 6, 7, and 8 show constructions based upon the herein-described mechanism. Figs. $9^a$, $9^b$, $9^c$, $9^f$, $9^d$, $9^e$, $9^f$, and $9^{II}$ show a modified construction in the different phases of its movement.
Figure 9:
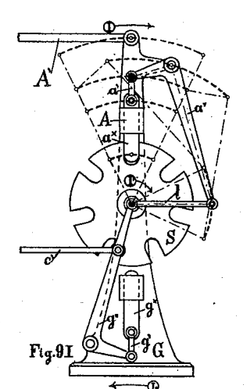

Fig. 5 shows a construction in which the system described with reference to Figs. 1 to $1^f$ is carried out in connection with a mechanism with frictional locking devices, in which a bar S, described in a framing G, has to be advanced with a step-by-step motion and held stationary, this being effected by a mechanism the driving of which is effected by a revolving shaft. On such shaft are mounted three cam-groove drums KA, K$a$, K$g$, which work the actuating-bar A, the actuating-pawl $a^\times$, and the locking-pawl $g^\times$ by means of levers A' $a'$ $g'$ and connecting devices. The lines A A, $a^\times a^\times$, and $g^\times g^\times$, Fig. 1, are here carried out as cylindrical curves and give the required positively-controlled motion, as clearly seen from the Roman and Arabic numerals and letters $a b c$ in Fig. 5. For further elucidation diagram figures are given at Figs. $5^a$ and $5^b$, of which Fig. $5^b$ clearly shows the consecutive phases of motion.

Fig. 6 shows the system described with reference to Figs. 3 to $3^f$ as carried out by a step-by-step mechanism with toothed locking-gear, the part S being in this case in the form of a spur-wheel. The working is here effected by means of a cam-groove disk K, revolving on a shaft mounted in the framing G, there being two cam-grooves in one and the same plane that represent polar projections of the lines A A and $a^\times a^\times$, Fig. 3, and the outer one of which serves for actuating the pawl-lever A, mounted concentrically with the ratchet-wheel S, while the inner one works the actuating-pawl $a^\times$ by means of the three-armed lever $c^\times a' g'$. The time intervals are in this case so disposed that for the engagement of the actuating-pawl $a^\times$ (1) and the simultaneously-effected disengagement of the locking-pawl $g^\times$ (2) from $a$ to $c$ an angle of sixty degrees is employed, for the useful motion (I) from $c$ to $d$ an angle of one hundred and eighty degrees, for the engagement of the locking-pawl $g^\times$ (3) and the simultaneous disengagement of the actuating-pawl $a^\times$ (4) from $d$ to $f$ again an angle of sixty degrees, and for the idle return motion of the actuating-lever A (I°) from $f$ to $a$ also an angle of sixty degrees.

Figs. 7 and 8 show, like the foregoing, special constructions of step-by-step mechanisms with pin-tooth gear, in which reference is more particularly made to the kinematic arrangement of the connection between the actuating and locking pawls, the actuating mechanism being only indicated by two broken coupling-rods A' and $c'$. The actuating-lever A is in this, as also in all the following cases, mounted in the frame G, concentrically with the ratchet-wheel S. The ratchet-wheel S is shown in Fig. 7 in the form of a disk with laterally-projecting cylindrical pins. In Fig. 8 it is in the form of a ring with internal notch-shaped teeth, while in Figs. $9^a$ to $9^{II}$ it is in the form of a disk with peripheral notches.

In Fig. 7 the actuating and locking pawls $a^\times g^\times$ are pivoted, respectively, to the lever A and to the framing G. With the pawl $g^\times$ are rigidly connected both the lever $c^\times$, with which the actuating-rod $c'$ is attached, and the lever $a'$, whose free end is connected with the actuating-pawl $a^\times$ by a link $l$. By this means the two pawls are caused to come into and out of gear with the ratchet-wheel S alternately. When the actuating-rod $c'$ moves to the right, the pawl $g^\times$ is raised out of gear and lever $a$ has its end moved toward the common center of the ratchet-wheel S and actuating-lever A, in consequence whereof the rod $l$ will assume a radial position relatively to and the actuating-pawl $a$ is put in gear therewith. If the driving-rod A' be then moved to the right, the wheel S will be moved in the same direction by the lever A by means of the pawl $a^\times$, there being then no relative motion between the parts A, $a^\times$, $l$, and S. If by the then following motion to the left of rod $c'$ the two pawls have their positions reversed, the motion to the left of rod A' will effect the idle return motion of the lever A, the extremity of the actuating-pawl $a^\times$ being at the same time moved back outside the wheel S in a curve that is not concentric with the latter. The small relative motion which occurs between A and $a^\times$ (which is of no consequence to the desired action) is avoided in the arrangement at Fig. 8 and all the following figures, as both during the operative motion and during the idle return motion of the lever A no relative motion takes place between this and the actuating-pawl $a^\times$.

In Fig. 8 both the pawls $a^\times$ and $g^\times$ are so connected by a link $l$ that during the to-and-fro motion of the lever A only single relative motion takes place between the rod $l$ and the one or the other pawl around the upper or lower pivot of the rod $l$, which always coincides with the center of the actuating-lever A and the center of the ratchet-ring S. During the forward motion of the latter the actuating-pawl $a^\times$ and the rod $l$ turn together around the lower pivot of the latter as of one piece with the lever A. During the locking phase the rod $l$ and the locking-pawl $g^\times$ are stationary as of one piece with the framing G and ratchet-ring S, while the actuating-pawl $a^\times$ turns, together with the actuating-lever A, around the upper pivot of the link $l$. The two pawls $a^\times$ and $g^\times$ are actuated by the lever $c^\times$, pivoted on the frame G and worked by rod $c'$.

In Figs. $9^a$, $9^b$, $9^c$, $9^I$, $9^d$, $9^e$, $9^f$, and $9^{II}$ the several phases of motion or positions of the parts are shown, being designated in the same manner as the diagram Fig. 3. The motion of the driving-rod A' when transmitted to the actuating-lever A takes place according to curve A A, while the motion of the rod $c'$, by which the pawls $a^\times$ and $g^\times$ have to be actuated according to the two symmetrical curves $a^\times a^\times$ and $g^\times g^\times$, has to take place according to the first curve $a^\times a^\times$. This motion is transmitted, on the one hand, by the lever $g''$ by means of the link $l$ of the elbow-lever $a''$, pivoted to the actuating-lever A, and the coupling-rod $a'$ to the actuating-pawl $a^\times$, capable of sliding on the lever A, and, on the other hand, it is transmitted by means of the coupling-rod $a'$ to the locking-pawl $g^\times$, sliding on the frame G. It will be evident that in the place of the sliding pawls $a^\times$ and $g^\times$, actuated by elbow lever and link, an actuating-pawl $a^\times$ and a locking-pawl $g^\times$ may be employed, similar to Fig. 7. The former arrangement was preferred in the above case in order to more distinctly show the peculiarities of the several phases of motion.

Figure 10:
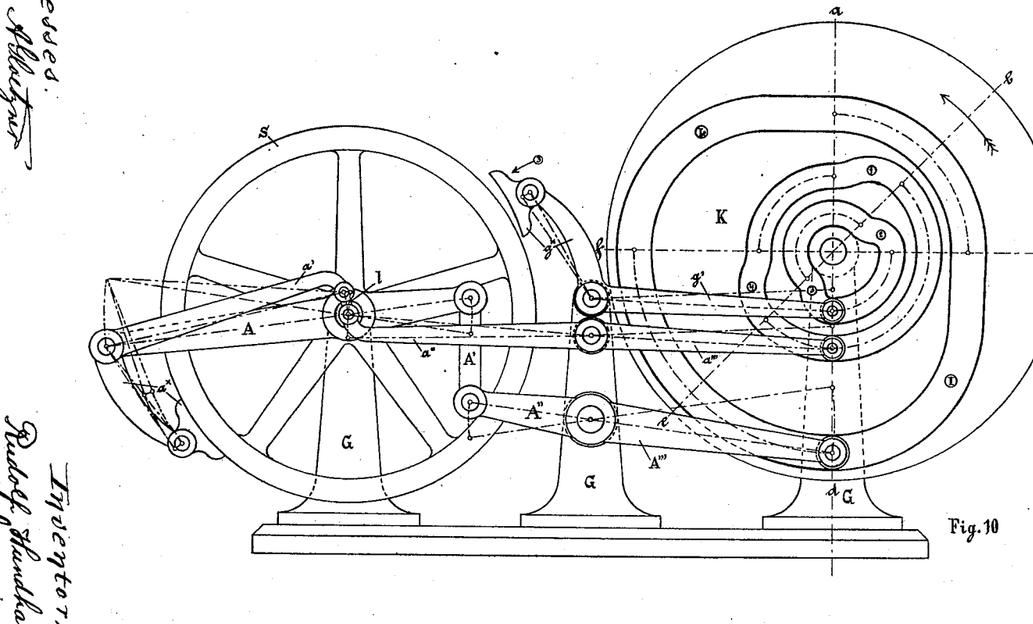
Figs. 10 to 15 show other modifications.

While with toothed ratchet mechanisms it is possible, although not absolutely necessary, that the two pawls should be directly connected together, this is not possible with frictional ratchet mechanisms, so that the above-described lever connection with the guide-link $l$ in this case serves exclusively for working the actuating-pawl $a^\times$, while the actuation of the locking-pawl is effected separately by direct action. Such a mechanism is shown at Fig. 10, where a cam-groove disk K is rotatably mounted on the framing G for actuating the two pawls $a^\times$ and $g^\times$ and actuating lever A. The motion of the locking-pawl $g^\times$ is effected by the inner cam-groove through the lever $g'$, connected to it. The working of the actuating-pawl $a^\times$ is effected by means of the middle cam-groove through the lever $a'$, guide-link $l$, and double lever $a''$ $a'''$. The working of the actuating-lever A is effected by means of the outer cam-groove through the coupling-rod A' and the double lever A'' A'''.

Figure 11:
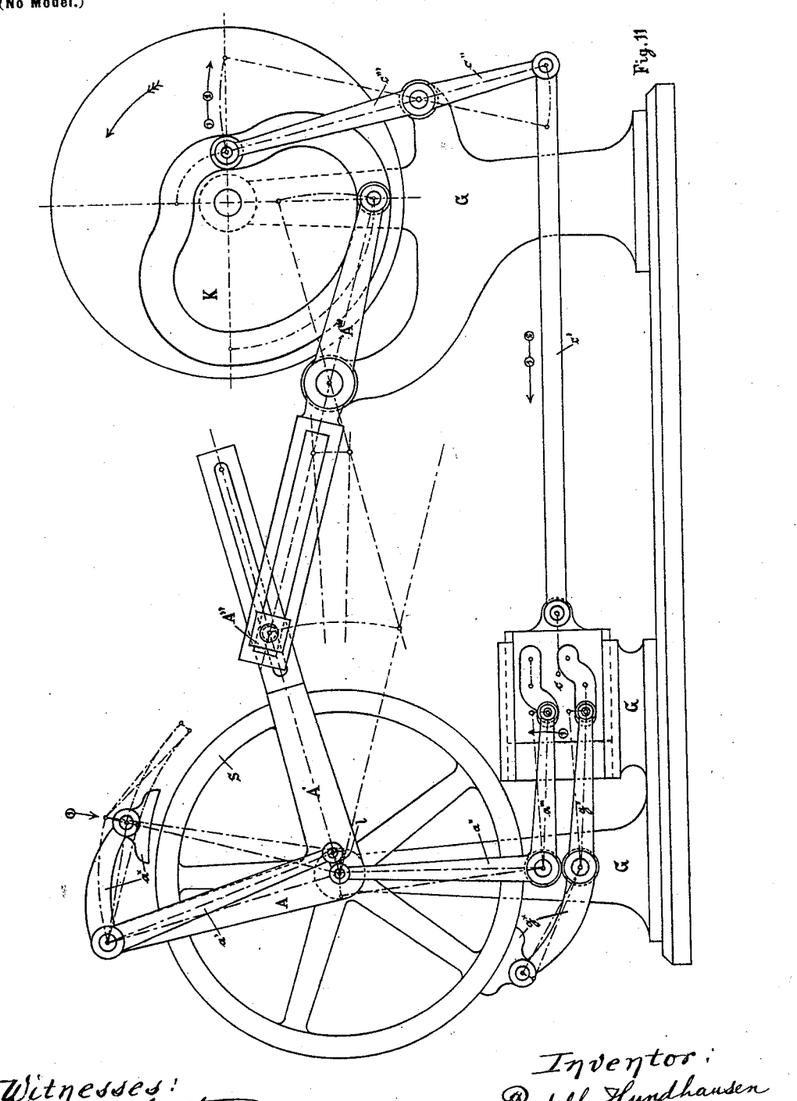

Fig. 11 shows an arrangement in which a variable ratio of transmission can be introduced between the levers A' and A''', whereby the angle of advance of the ratchet-wheel S can be made greater and smaller. This figure also shows that it is, for example, possible to effect the motion of the actuating and locking pawls by means of a special sliding cam-groove $c^\times$ instead of the revolving cam K, the slide $c^\times$ having a to-and-fro motion imparted to it from the cam K by means of a connecting-rod $c'$ and double-ended lever $c''$ $c'''$. This figure also shows that a single revolving cam is sufficient for effecting both the to-and-fro motion, with intervals, of the ratchet-lever gear A A' A'' A''', as also that of the lever $c''$ $c'''$ and of the other gear, which effects the motion of the pawls $a^\times$ and $g^\times$, in the described manner, as shown on the drawings. Instead of employing two cam-grooves shifted relatively to each other the pivots of the levers A'' A''' and $c''$ $c'''$ are in this case shifted relatively to the cam-groove.

Figure 12:
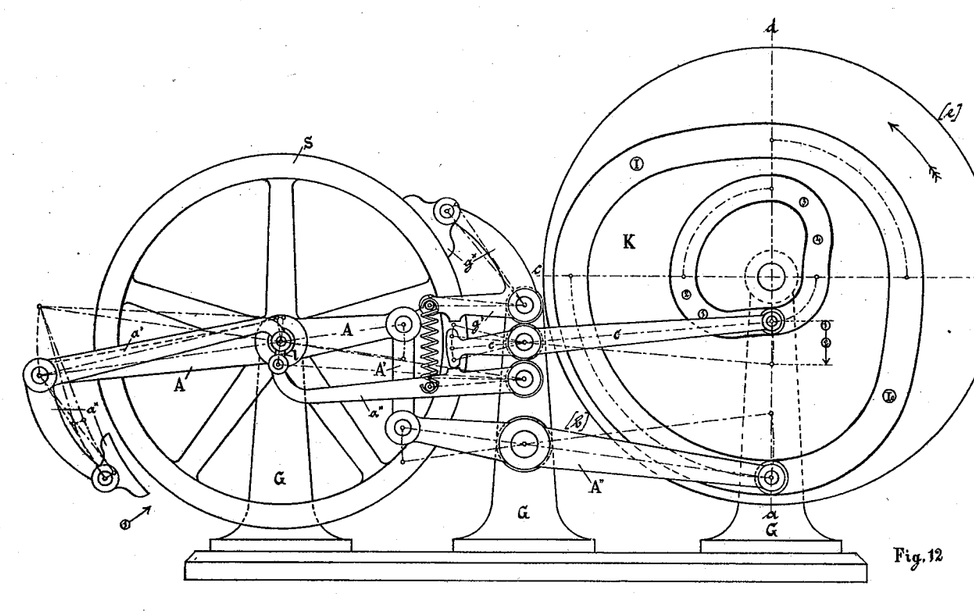

Fig. 12 shows another arrangement wherein the two frictional ratchet-pawls $a^\times$ and $g^\times$ are actuated by a single cam-groove and a single lever $c^\times$, with the employment of a spring connection between the levers $g'$ and $a''$.

Figure 13:
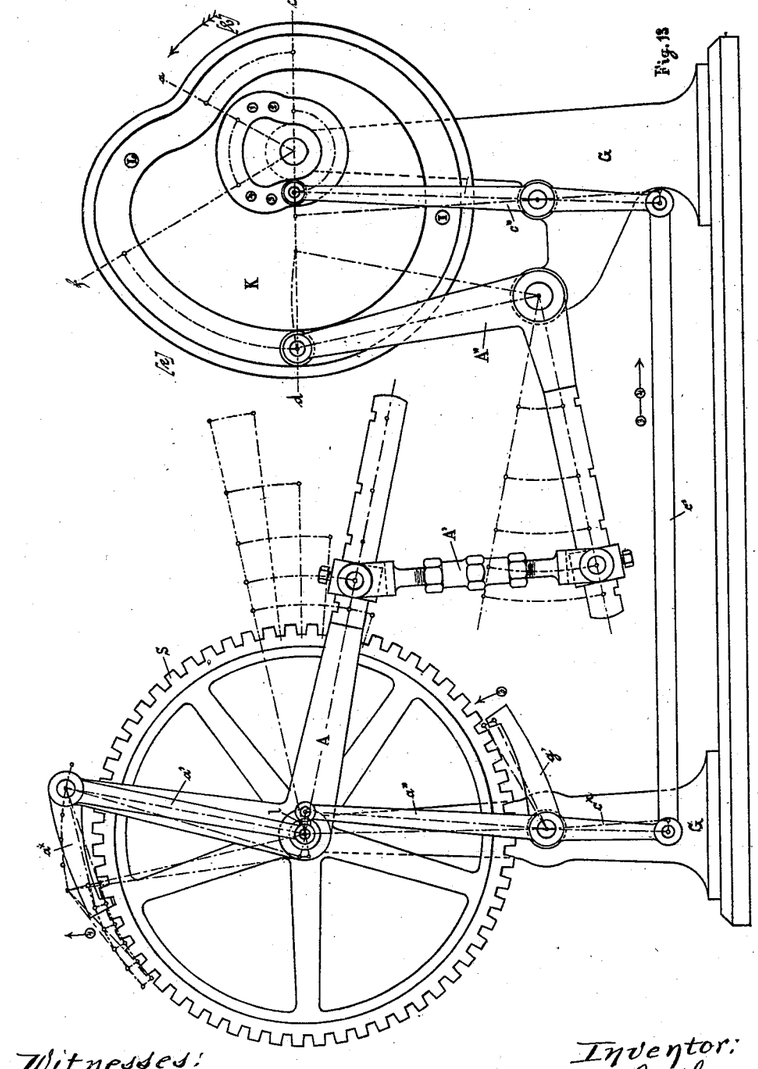
Figure 14:
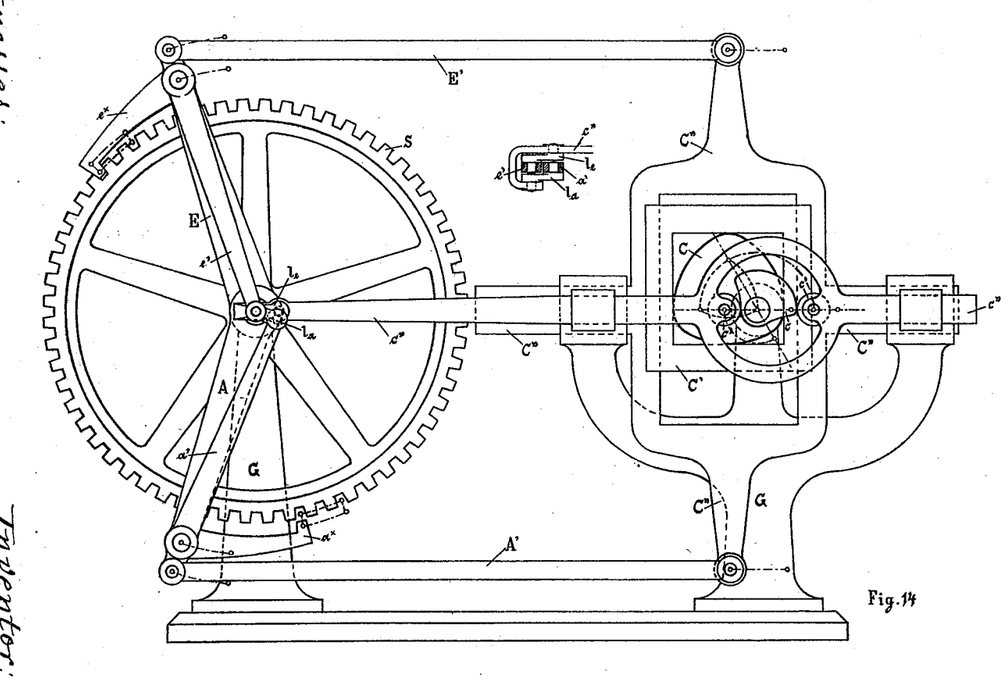
Figure 15:
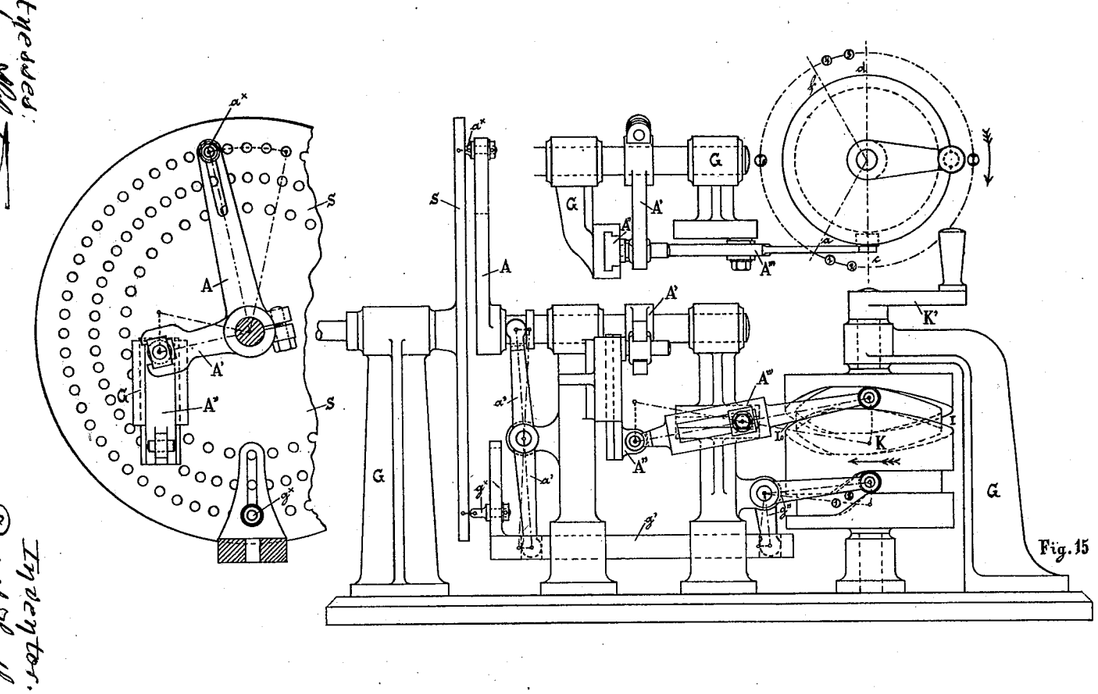

Figs. 13 to 15 show ratchet-gear with toothed ratchet devices. Fig. 13 shows the arrangement for varying the ratio of transmission between the levers A and A'', as in Fig. 11. It will be seen that by means of the positive motion the angle of advance of the ratchet-wheel S can be readily made to vary one or more teeth divisions. The angular division of the cam-disk K for the several movement phases is in this case arranged as at Fig. 6, so as to produce as slow an acceleration and retardation as possible in the forward motion of the ratchet-wheel S, while in the idle return motion of the ratchet-lever gear A A' A'', as also in the actuation of the pawl mechanism $a^\times$ $a'$ $a''$ $g^\times$ $c^\times$ $c'$ $c''$, as comparatively-small masses have to be dealt with, the to-and-fro motion can take place in a shorter interval of time.

Fig. 14 shows an arrangement, with positive double motion, of toothed ratchet-gear. In this case there are two actuating-pawls $a^\times$ and $e^\times$, which are both worked by the common driving-rod $c''$ by means of the levers $a'$ and $e'$, rigidly connected thereto, and the two guide-links $l_a$ and $l_e$, while the driving-rod $c''$ receives its to-and-fro motion, with intervals of rest, by means of the cam $c^\times$, revolving between the two rollers $c'$ $c'$, carried in $c''$, the periphery of the cam being made with such curves as to "fit and fill." The two actuating-levers A and E are simultaneously worked by the connecting-rods A' and E', pivoted to the lopped cross-head, in which works a rectangular slide C', containing a revolving triangular cam C. The two cams C and $c^\times$ are fixed rigidly on the same shaft, which revolves in bearings in the frame G. This arrangement shows that the to-and-fro movements at intervals can also be obtained by other means than by the ordinary cam action of the previously-described constructions.

Fig. 15 finally shows an arrangement in which the ratchet-disk S is made in the form of a dividing-plate of the form commonly used in machine-tools, the disk being provided with a number of circular rows of cylindrical holes bored parallel to the axis. The actuating-lever A is rotatably and adjustably mounted in the framing G. It receives its rotation from the upper curve of the cam-drum K by means of the lever A, adjustably fixed thereto by means of the connecting-bar A'', guided in the framing G, and by means of the rocking lever A''', pivoted to the framing G, the cam-drum being rotated by the crank K'. The lower cam-groove effects, by means of the elbow-lever $g''$, not only the motion of the locking-pawl $g^\times$, sliding in the framing G and which engages with the division-plate by means of the locking-pin $g^\times$, but it also effects the to-and-fro motion of the actuating-lever A by means of the double-ended lever $a'$, pivoted to the framing. The lever A, together with its axis adjustable in the framing and the devices combined therewith, operates as the actuating-pawl and engages by means of its pin $a^\times$ with the holes of the dividing-plate. By means of the guides provided on the lever A''' and on the corresponding part of the framing provision is made for varying the angle of advance in order to enable the plate to be turned through a varying number of divisions by means of one and the same cam-disk.

The above-described improved mechanism for obtaining a controlled positive step-by-step motion can be applied with advantage in a variety of cases and in particular in those where it is necessary to obtain a rapid and reliable forward motion of ratchet devices, such as in machines for stamping the grooves in sheet-iron for the armature of dynamos on account of its absolutely-accurate action at high speeds.

Having now particularly described and ascertained the nature of this invention and in what manner the same is to be performed, I declare that what I claim is—

1. In mechanism for effecting step-by-step motion, the combination with an actuating device, means for reciprocating the same, a part receiving the said step-by-step motion, and a pair of pawls movably fastened to the actuating device and to the frame of the mechanism respectively and operating the receiving part as a stationary ratchet, of means for firmly locking said receiving part by means of said pawls always either with the actuating device or with the frame of the mechanism or with both.

2. In mechanism for effecting step-by-step motion, the combination with, an actuating device, means for reciprocating the same, a part receiving the said step-by-step motion, and a pair of pawls movably fastened to the actuating device and to the frame of the mechanism respectively and operating the receiving part as a stationary ratchet, of means for firmly locking said receiving part by means of said pawls always either with the actuating device or with the frame of the mechanism or with both, and a second actuating device movably carried by the frame of the mechanism and positively connected with the pawl fastened to the said frame.

3. In mechanism for effecting a rotatory step-by-step motion, the combination with, an actuating device, means for reciprocating the same, a part receiving the step-by-step motion, and a pair of pawls, of means for alternately locking said actuated part by means of one of said pawls with the framing of the mechanism and relieving it therefrom, and a connecting-rod between the other pawl and the first, one pivot of which coincides with the geometric axis of the actuated part in the period in which the latter is relieved from the framing.

4. In mechanism for effecting a rotatory step-by-step motion, the combination with, an actuating device, means for reciprocating the same, a part receiving the step-by-step motion, and a pair of pawls, of means for alternately locking said actuated part by means of one of said pawls with the framing of the mechanism and relieving it therefrom, and a connecting-rod between the other pawl and the first, the pivots of which alternately coincide with the geometric axis of the actuated part.

5. In mechanism for effecting step-by-step motion the combination with, an actuating device, means for reciprocating the same, a part receiving the said step-by-step motion, and a pair of pawls movably fastened to the actuating device and to the frame of the mechanism respectively and operating the receiving part as a stationary ratchet, of means for firmly locking said receiving part by means of said pawls always either with the actuating device or with the frame of the mechanism or with both, and means for altering the amount of the step-by-step motion.

In testimony whereof I have affixed my signature in presence of two witnesses.

RUDOLF HUNDHAUSEN.

Witnesses:
 HENRY HASPER,
 WOLDEMAR HAUPT.